(12) United States Patent
Willems et al.

(10) Patent No.: US 9,951,200 B2
(45) Date of Patent: Apr. 24, 2018

(54) THERMOPLASTIC COMPOSITIONS SUITABLE FOR USE IN FILMS

(71) Applicant: SABIC GLOBAL TECHNOLOGIES B.V., Bergen op Zoom (NL)

(72) Inventors: Maria Johanna Willems, Lummen (BE); Bernardus Aldegonda Josephus Raven, Oirsbeek (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/309,655

(22) PCT Filed: May 13, 2015

(86) PCT No.: PCT/EP2015/060591
§ 371 (c)(1),
(2) Date: Nov. 8, 2016

(87) PCT Pub. No.: WO2015/173301
PCT Pub. Date: Nov. 19, 2015

(65) Prior Publication Data
US 2017/0145188 A1 May 25, 2017

(30) Foreign Application Priority Data
May 15, 2014 (EP) ..................... 14168522

(51) Int. Cl.
| | |
|---|---|
| *C08K 3/22* | (2006.01) |
| *C08K 5/134* | (2006.01) |
| *C08K 5/526* | (2006.01) |
| *B32B 27/08* | (2006.01) |
| *B32B 27/32* | (2006.01) |
| *B32B 27/18* | (2006.01) |
| *B65D 71/06* | (2006.01) |
| *B65D 19/00* | (2006.01) |

(52) U.S. Cl.
CPC ............ *C08K 5/1345* (2013.01); *B32B 27/08* (2013.01); *B32B 27/18* (2013.01); *B32B 27/32* (2013.01); *B65D 19/00* (2013.01); *B65D 71/063* (2013.01); *C08K 3/22* (2013.01); *C08K 5/526* (2013.01); *B32B 2307/7244* (2013.01); *C08K 2003/2296* (2013.01)

(58) Field of Classification Search
CPC ........ C08K 5/1345; C08K 5/526; C08K 3/22; C08K 2003/2296; B32B 27/08; B32B 27/32; B32B 27/18; B32B 2307/7244; B65D 71/063; B65D 19/00
USPC ....................................................... 524/430
See application file for complete search history.

(56) References Cited

U.S. PATENT DOCUMENTS

| | | | |
|---|---|---|---|
| 3,330,859 A | 7/1967 | Esters et al. | |
| 3,960,928 A | 6/1976 | Mauz | |
| 5,017,714 A | 5/1991 | Welborn, Jr. | |
| 5,132,344 A * | 7/1992 | Matteodo | C08K 3/22 524/101 |
| 5,324,820 A | 6/1994 | Baxter | |
| 6,329,465 B1 * | 12/2001 | Takahashi | C08L 23/0815 525/191 |
| 6,593,485 B1 * | 7/2003 | Stoll | C08K 5/0008 252/400.4 |
| 6,846,859 B2 † | 1/2005 | Coffy | |
| 2009/0061062 A1 | 3/2009 | Beckwith et al. | |

FOREIGN PATENT DOCUMENTS

| | | |
|---|---|---|
| EP | 0206413 † | 12/1986 |
| EP | 0785065 A2 | 7/1997 |
| WO | 9856580 | 12/1998 |
| WO | 9932527 A1 | 7/1999 |
| WO | 2006133968 A1 | 12/2006 |
| WO | 2015173301 A1 | 11/2015 |

OTHER PUBLICATIONS

Butler, "Film Extrusion Manual" 2nd Edition; 2005;413-435.
E.M. Adel-Bary. "Handbook of Plastic Films"; iSmithers Rapra Publishing;2003:16-17.
International Search Report; International Application No. PCT/EP2015/060591;International Filing Date May 13, 2015; dated Jun. 11, 2015, 4 pages.
Jonson, "Challenges to Packaging in a Global World"; Marcus Wallenberg Prize Symposium;2005.
Marsh et al., "Food Packaging-Roles, Materials, and Environmental Issues." Journal of Food Services;2007;72;3:39-55.
Peacock, "Handbook of Polyethylene" (2000; Dekker; ISBN 0824795466) pp. 43-66.
Written Opinion of the International Searching Authority; International Application No. PCT/EP2015/060591; International Filing Date May 13, 2015; dated Jun. 11, 2015, 4 pages.
Peacock, titled Handbook of Polyethylene Structures, Properties, and Applications, published by Marcel Dekker, Inc., pp. 3, and 224-226, 2000.†
US Statutory Invention Registration H1600 to inventor Stephen M. Imfeld et al., titled High Density Polyethylenes With Improved Processing Stability, published on Oct. 1, 1996.†
Motttier et al., "LC-MS/MS analytical procedure to quantify tris(nonylphenyl)phosphite, as a source of the endocrine disruptors 4-nonylphenols, in food packaging materials", Food Additives & Contaminants: Part A, Taylor & Francis, (2014) vol. 31, No. 5, pp. 962-972.†

* cited by examiner
† cited by third party

*Primary Examiner* — Hui Chin
(74) *Attorney, Agent, or Firm* — Cantor Colburn LLP

(57) ABSTRACT

The invention relates to a linear low density polyethylene composition comprising a linear low density polyethylene having a melt flow index of 1.5-2.5, a phenolic antioxidant, a processing stabilizer and ZnO, wherein the composition is free or substantially free of tris(nonylphenyl) phosphite (TNPP).

19 Claims, No Drawings

THERMOPLASTIC COMPOSITIONS SUITABLE FOR USE IN FILMS

This application is a national stage application of PCT/EP2015/060591 filed May 13, 2015, which claims priority to European Application Number 14168522.2 filed May 15, 2014, both of which are hereby incorporated by reference in their entirety.

The present invention relates to a thermoplastic composition suitable for use in films such as a shrink film made by a blown film co-extrusion process and a stretch film made by a casting process. The present invention also relates to a film comprising such composition.

Stretchable films are suitable for stretch wrapping (i.e. non-heat shrinkable). Stretch wrapping films are particularly used for wrapping unitized objects such as packaging various types of goods, from retail foods, such as (bottled) beverages and cigarettes to carpets and furniture, for wrapping loaded shipping pallets and large articles, such as furniture, carpets, books etc.

Stretch films are stretched around the object and then adhered to itself; the tendency of the adhered film to resist further stretching provides a load containment force.

For shrink films, the film is wrapped around the object and then shrunk, typically by heating, to provide a load containment force.

Environmental considerations are important for packaging materials. Energy consumption along the value chain should be minimal and also down-gauging, i.e. using less material (e.g. though thinner films) is therefore very important.

In addition, the films should have good properties to make it suitable to be used for packaging. Good properties include but are not limited to good tear (cross) resistance, good optical properties, good holding force, suitable elongation and other good mechanical properties, such as impact resistance, puncture resistance, tensile strength, tear strength etc.

Further, films for storing food and beverages should comply with safety requirements and should contain no compounds which may be harmful to human or animal health.

During the last years many packaging film converters have chosen to change from monolayer to multilayer films, with a trend to a higher amount of layers in a film. A major reason for this trend is that companies as well as consumers pay more and more attention to environmental and sustainability aspects of packaging (see e.g. Challenges to Packaging in a global world, Gunilla Jonson, Marcus Wallenberg Prize symposium, Sep. 30, 2005 and Marsh, Food Packaging, Journal of Food Science, Vol. 72, 3, 2007, pages 39-55).

When using multilayer films, it is possible to use films having a lower film thickness while retaining the desired properties for the packaging material. Since less material is needed for these multilayer films, sustainability of the packaging material prepared from said films is improved.

Two main methods for making a multilayer film are the blown film co-extrusion process and the casting process. Food package films comprise an oxygen barrier film which typically requires processing at a higher temperature, e.g. more than 260° C. or even more than 280° C. A high temperature stability is therefore needed for the composition to be processed. Such films are typically made by the blown film co-extrusion process. Both processes require a certain range of melt flow index for processability. The casting process typically requires a higher melt flow index (MFI) of the composition to be processed than the blown film co-extrusion process.

WO98/56580 A1 discloses a stretchable multilayer film in which at least one outer layer (A) comprises a linear low density polyethylene (LLDPE), at least one intermediate layer (B) comprises a polyolefin composition containing LLDPE and a propylene polymer having an insolubility in xylene higher than 70%, and at least another layer (C) comprises a very low density polyethylene (VLDPE).

EP0785065A2 discloses a stretch wrapping film (i.e. non-heat shrinkable) having (i) skin layers and (ii) at least one core layer which includes at least 5% by weight, more preferably from about 10% to about 80% by weight (of the layer composition) of a propylene polymer, preferably a propylene homopolymer; for the film as a whole the propylene content ranges from about 5% to about 65% by weight (of the film). In more preferred embodiments, the films include skin layers, intermediate layers and a core layer. At least one of the intermediate and core layers contains the propylene polymer, which is preferably a homopolymer or a blend of homopolymer with linear low density polyethylene (LLDPE); the skin layers comprise an ethylene polymer, preferably having a tacky LLDPE composition.

It is an objective of the present invention to provide an LLDPE composition which has a high temperature processability, which can be made into films suitable for food application having good mechanical properties.

Accordingly, the present invention provides a linear low density polyethylene composition comprising a linear low density polyethylene having a melt flow index of 1.5-2.5, a phenolic antioxidant, a processing stabilizer and ZnO, wherein the composition is free or substantially free of tris(nonylphenyl) phosphite (TNPP).

The combination of the phenolic antioxidant, the processing stabilizer and ZnO (hereinafter sometimes collectively referred as stabilizing additives) was found to allow high temperature processing Hence, the LLDPE composition according to the invention can advantageously be processed, especially by the blown film co-extrusion process, at a high temperature into a multilayer film. The LLDPE composition according to the invention can be processed, especially by the casting process, into a film having good mechanical properties such as tear strength and dart impact strength.

In addition, the amount of deposits formed during the processing of the LDPE composition according to the invention may be low. The deposit formation may be visually determined. The amount of deposit formed at the exit of the die may be determined after a period of time after the start of the process, e.g. after 5 minutes, 15 minutes, 30 minutes or 1 hour. Thus, compared to known LDPE compositions, the LDPE composition according to the invention may have a lower amount of deposits after the same period of time or it may take a longer time before the formation of the first droplet.

The LLDPE composition according to the invention comprises only (stabilizing) additives which are food approved and not suspected as carcinogenics. The LLDPE composition according to the invention does not comprise tris (nonylphenyl) phosphite (TNPP) which is typically used as a processing stabilizer. The use of TNPP in food application is considered undesirable since it decomposes during processing into a substance suspected to have a health affect in some countries. Therefore, the LLDPE composition according to the invention can advantageously be used for the production of films for food application. The composition free or substantially free of TNPP is herein understood to mean that the composition is prepared without adding TNPP to the LLDPE.

LLDPE

The LLDPE composition comprises an LLDPE having an MFI of 1.5-2.5 and stabilizing additives. The LLDPE composition can be made by mixing the LLDPE and the stabilizing additives. The LLDPE composition has substantially the same MFI as the base LLDPE used for making the LLDPE composition.

For purpose of the invention, the melt flow index is determined herein using ISO1133:2011 (190° C./2.16 kg).

With linear low density polyethylene (LLDPE) as used herein is meant a low density polyethylene copolymer comprising ethylene and a C3-C10 alpha-olefin co monomer (ethylene-alpha olefin copolymer) having a density from 915 to 934 kg/m³. More preferably, the density of the linear low density polyethylene is from 917 to 920 kg/m³.

Alpha-olefin co monomers include 1-butene, 1-hexene, 4-methyl pentene and 1-octene. Preferably, the alpha-olefin co monomer is present in an amount of about 5 to about 20 percent by weight of the ethylene-alpha olefin copolymer, for example in an amount of from about 7 to about 15 percent by weight of the ethylene-alpha olefin copolymer.

For purpose of the invention, the density of the linear low density polyethylene is determined using ISO1183.

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

Stabilizing Additives

The LLDPE composition according to the invention comprises a phenolic antioxidant, a processing stabilizer and ZnO. These additives are preferably present in the LLDPE composition in the amount of at least 1300 ppm, at least 1500 ppm or at least 2000 ppm. These additives are preferably present in the LLDPE composition in the amount of at most 4000 ppm, at most 3500 ppm or at most 3000 ppm. This amount of the stabilizing additives was found to result give a high thermal stability to the LLDPE.

Phenolic Antioxidant

Preferably, the phenolic antioxidant is a compound represented by general formula (I):

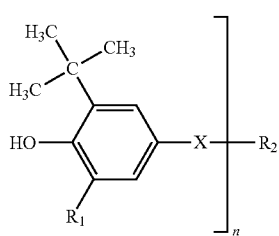

(I)

in which
$R_1$ is $C_1$-$C_4$ alkyl,
n is 1, 2, 3 or 4,
X is methylene,

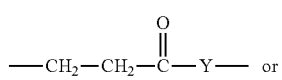 or

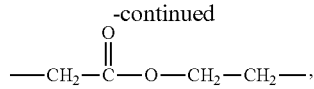

Y is hydrogen or —NH—; and,
if n is 1,
X is

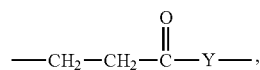

where Y is attached to $R_2$, and
$R_2$ is $C_1$-$C_{25}$ alkyl; and,
if n is 2,
X is

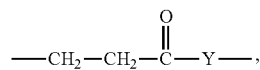

where Y is attached to $R_2$, and
$R_2$ is $C_2$-$C_{12}$ alkylene, $C_4$-$C_{12}$ alkylene interrupted by oxygen or sulfur; or, if Y is —NH—,
$R_2$ is additionally a direct bond; and,
if n is 3,
X is methylene or

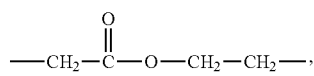

where the ethylene group is attached to $R_2$, and
$R_2$ is

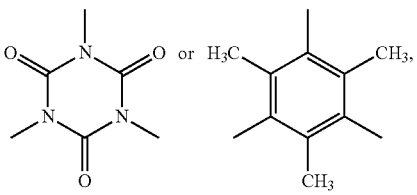

and
if n is 4,
X is

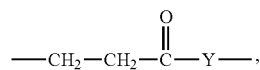

where Y is attached to $R_2$, and
$R_2$ is $C_4$-$C_{10}$ alkanetetrayl.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred definition of $R_1$ is methyl and tert-butyl. A particularly preferred definition of $R_2$ is $C_1$-$C_{20}$ alkyl, especially $C_1$-$C_{18}$ alkyl, for example $C_4$-$C_{18}$ alkyl. An especially preferred definition of $R_2$ is $C_8$-$C_{18}$ alkyl, especially $C_{14}$-$C_{18}$ alkyl, for example $C_{18}$ alkyl.

$C_2$-$C_{12}$ alkylene is a branched or unbranched radical, for example ethylene, propylene, tetramethylene, pentamethylene, hexamethylene, heptamethylene, octamethylene, decamethylene or dodecamethylene. A preferred definition of $R_2$ is, for example, $C_2$-$C_{10}$ alkylene, especially $C_2$-$C_8$ alkylene. An especially preferred definition of $R_2$ is, for example, $C_4$-$C_8$ alkylene, especially $C_4$-$C_8$ alkylene, for example hexamethylene.

$C_4$-$C_{12}$ alkylene interrupted by oxygen or sulfur can be interrupted one or more times and is, for example, —CH$_2$O—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$—, —CH$_2$CH$_2$—O—CH$_2$CH$_2$—O—CH$_2$CH$_2$— or —CH$_2$CH$_2$—S—CH$_2$CH$_2$—. A preferred definition of $R_2$ is, for example, $C_4$-$C_{10}$ alkylene interrupted by oxygen or sulfur, especially $C_4$-$C_8$ alkylene interrupted by oxygen or sulfur, for example $C_4$-$C_4$ alkylene interrupted by oxygen or sulfur. An especially preferred meaning of $R_2$ is —CH$_2$CH$_2$—O—CH$_2$CH$_2$—O—CH$_2$CH$_2$— or —CH$_2$CH$_2$—S—CH$_2$CH$_2$—.

Alkanetetrayl having 4 to 10 carbon atoms is, for example,

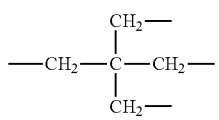

(pentaerythrityl)

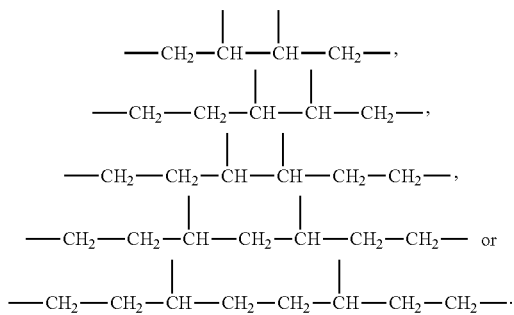

Pentaerythrityl is preferred.

The phenolic antioxidant may also comprise mixtures of different sterically hindered phenols of the formula I.

The compositions of interest include those comprising as the phenolic antioxidant at least one compound of the formula I in which, if n is 1, $R_2$ is $C_1$-$C_{20}$ alkyl.

Preference is given to compositions comprising as the phenolic antioxidant at least one compound of the formula I in which, if n is 2, $R_2$ is $C_2$-$C_8$ alkylene, C4-$C_8$ alkylene interrupted by oxygen or sulfur; or, if Y is —NH—, $R_2$ is additionally a direct bond; and, if n is 3, X is methylene, $R_2$ is

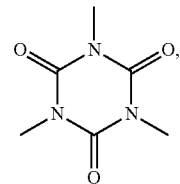

and, if n is 4, $R_2$ is $C_4$-$C_8$ alkanetetrayl.

Preference is likewise given to compositions comprising as the phenolic antioxidant at least one compound of the formula I in which $R_1$ is methyl or tert-butyl, n is 1, 2, 3 or 4, X is methylene or

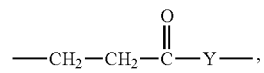

Y is hydrogen or —NH—; and, if n is 1, $R_2$ is $C_{14}$-$C_{18}$ alkyl; and if n is 2, $R_2$ is $C_4$-$C_6$ alkylene, or is $C_4$-$C_6$ alkylene interrupted by oxygen; and, if n is 3, X is methylene, $R_2$ is

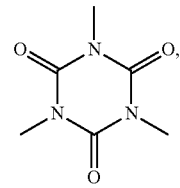

and, if n is 4, $R_2$ is $C_4$-$C_6$ alkanetetrayl.

Likewise of interest are compositions comprising as the phenolic antioxidant at least one compound of the formula I in which the compound of the formula I is a compound of the formula Ia to Ii

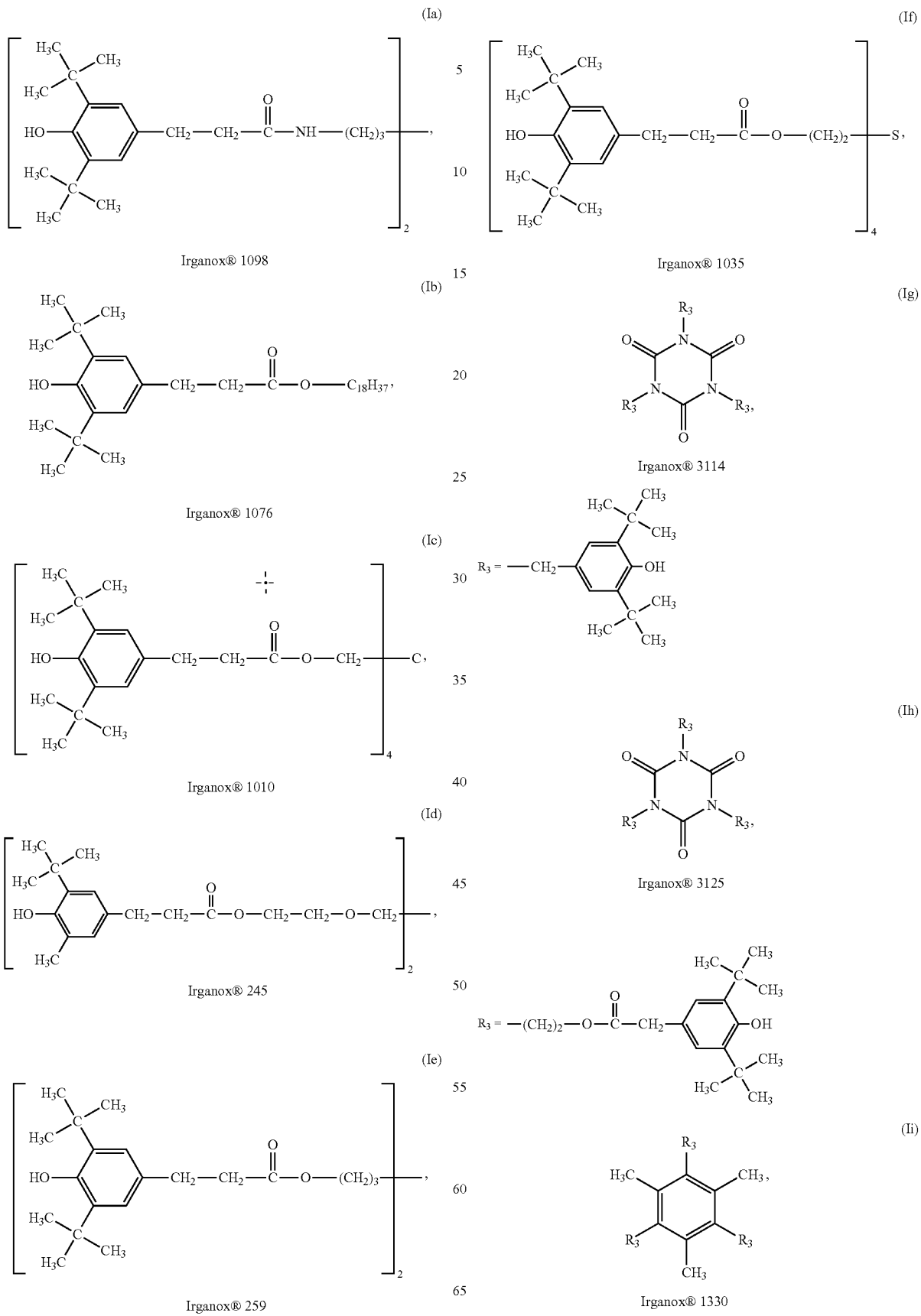

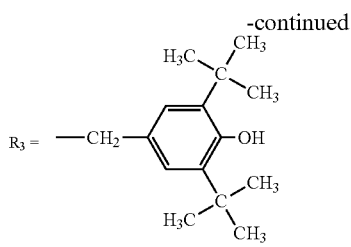

Irganox® 1098, Irganox® 1076, Irganox® 1010, Irganox® 245, Irganox® 259, Irganox® 3114, Irganox® 1035, Irganox® 3125 and Irganox® 1330 are protected trade names of Ciba Inc. Preference is given as the phenolic antioxidant at least one compound of the formula I in which the compound of the formula I is a compound of the formula Ia, Ib, Ic or Id, in particular a compound of the formula Ia, Ib or Ic.

The compounds of the formula I are known and in some cases obtainable commercially. Possible preparation processes for the compounds of the formula I can be found, for example, in the U.S. Pat. Nos. 3,330,859 or 3,960,928.

Most preferably, the phenolic antioxidant is Irganox® 1076.

Processing Stabilizer

The processing stabilizer is preferably selected from the group consisting of organic phosphites or phosphonites.

It will be appreciated that the compounds described herein exclude TNPP. In other words, the compounds described herein by general formulae covering TNPP are to be understood as groups of compounds excluding TNPP.

Of particular interest are compositions comprising as the processing stabilizer at least one compound of the group of the organic phosphites or phosphonites of the formulae II to VIII

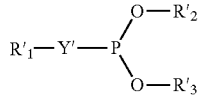 (II)

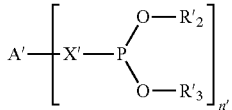 (III)

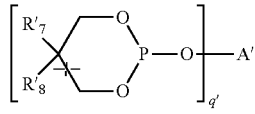 (VI)

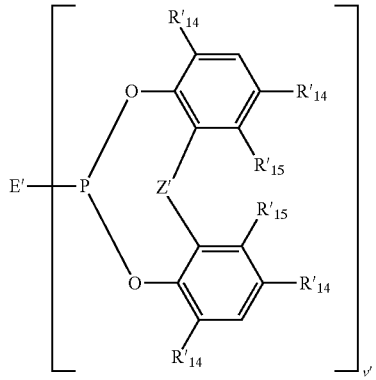 (V)

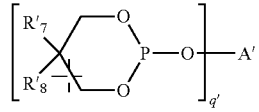 (VI)

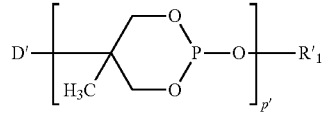 (VII)

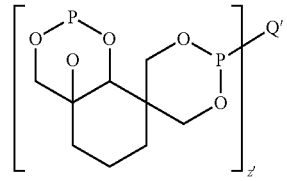 (VIII)

in which the indices are integral and n' is 2, 3 or 4; p' is 1 or 2; q' is 2 or 3; r' is 4 to 12; y' is 1, 2 or 3; and z' is 1 to 6;

A', if n' is 2, is $C_2$-$C_{18}$ alkylene; $C_2$-$C_{12}$ alkylene interrupted by oxygen, sulfur or —NR'$_4$; a radical of the formula

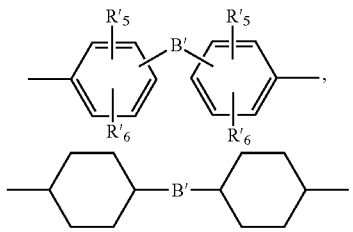

or phenylene;

A', if n' is 3, is a radical of the formula —$C_rH_{2r'-1}$;

A', if n' is 4, is

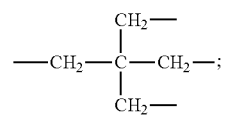

A" has the meaning of A' if n' is 2;

B' is a direct bond, —CH$_2$—, CHR'$_4$—, —CR'$_1$R'$_4$—, sulfur or $C_5$-$C_7$ cycloalkylidene, or cyclohexylidene substituted by from 1 to 4 $C_1$-$C_4$ alkyl radicals in position 3, 4 and/or 5;

D', if p' is 1, is methyl and, if p' is 2, is —CH$_2$OCH$_2$—;

E', if y' is 1, is $C_1$-$C_{18}$ alkyl, —OR'$_1$ or halogen;

E', if y is 2, is —O-A"-O—,

E', if y is 3, is a radical of the formula R'$_4$C(CH$_2$O—)$_3$ or N(CH$_2$CH$_2$O—)$_3$;

Q' is the radical of an at least z'-valent alcohol or phenol, this radical being attached via the oxygen atom to the phosphorus atom;

R'$_1$, R'$_2$ and R'$_3$ independently of one other are unsubstituted or halogen, —COOR$_4$'. —CN— or —CONR$_4$'R$_4$'-substituted $C_1$-$C_{18}$ alkyl; $C_2$-$C_{18}$ alkyl interrupted by oxygen, sulfur or —NR'$_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having in total 1 to 18 carbon atoms or by $C_7$-$C_9$ phenylalkyl; or are a radical of the formula

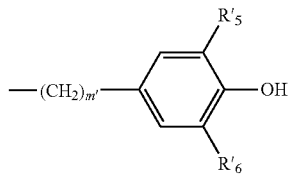

in which m' is an integer from the range 3 to 6;

$R'_4$ is hydrogen, $C_1$-$C_{18}$ alkyl, $C_5$-$C_{12}$ cycloalkyl or $C_7$-$C_9$ phenylalkyl, $R'_5$ and $R'_6$ independently of one another are hydrogen, $C_1$-$C_8$ alkyl or $C_5$-$C_6$ cycloalkyl, $R'_7$ and $R'_8$, if q' is 2, independently of one another are $C_1$-$C_4$ alkyl or together are a 2,3-dehydropentamethylene radical; and $R'_7$ and $R'_8$, if q' is 3, are methyl;

$R'_{14}$ is hydrogen, $C_1$-$C_9$ alkyl or cyclohexyl, $R'_{15}$ is hydrogen or methyl and, if two or more radicals $R'_{14}$ and $R'_{15}$ are present, these radicals are identical or different, X' and Y' are each a direct bond or oxygen, Z' is a direct bond, methylene, —$C(R'_{16})_2$— or sulfur, and $R'_{16}$ is $C_1$-$C_8$ alkyl.

Preferably the processing stabilizer is a compound of the formula II, III, IV or V

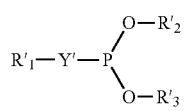

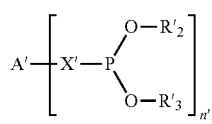

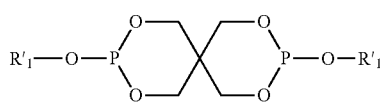

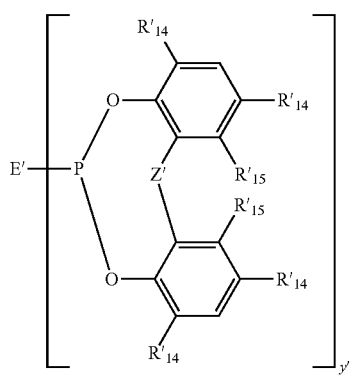

in which n' is the number 2 and y is the number 1, 2 or 3;

A is $C_2$-$C_{18}$ alkylene, p-phenylene or p-biphenylene,

E', if y' is 1, is $C_1$-$C_{18}$ alkyl, —$OR'_1$ or fluorine;

E', if y' is 2, is p-biphenylene,

E' if y' is 3, is $N(CH_2CH_2O—)_3$, $R'_1$, and $R'_3$ independently of one another are $C_1$-$C_{18}$ alkyl, $C_7$-$C_9$ phenylalkyl, cyclohexyl, phenyl, or phenyl substituted by 1 to 3 alkyl radicals having in total 1 to 18 carbon atoms;

$R'_{14}$ is hydrogen or $C_1$-$C_9$ alkyl, $R'_{15}$ is hydrogen or methyl;

X' is a direct bond,

Y' is oxygen,

Z' is a direct bond or —$CH(R'_{16})$—, and $R'_{16}$ is $C_1$-$C_4$ alkyl.

Particular preference is given as the processing stabilizer a phosphite or phosphonite of the formula II, III or V.

Special preference is given as the processing stabilizer at least one compound of the formula VII

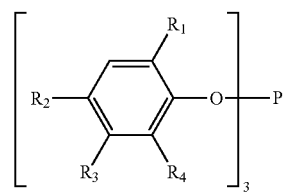

in which $R_1$ and $R_2$ independently of one another are hydrogen, $C_1$-$C_6$ alkyl, cyclohexyl or phenyl, and $R_3$ and $R_4$ independently of one another are hydrogen or $C_1$-$C_4$ alkyl.

The following compounds are examples of organic phosphites and phosphonites which are particularly suitable the processing stabilizer in the compositions.

Triphenyl phosphite, diphenyl alkyl phosphites, phenyl dialkyl phosphites, trilauryl phosphite, trioctadecyl phosphite, distearyl pentae-rythritol diphosphite, tris(2,4-di-tert-butylphenyl) phosphite (Irgafos® 168, Ciba Specialty Chemicals Inc.), diisodecyl pentaerythritol diphosphite, bis (2,4-di-tert-butylphenyl) pen-taerythritol diphosphite (formula D1), bis(2,6-di-tert-butyl-4-methylphenyl) pentaerythritol diphosphite (formula E1), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite (Irgafos®P-EPQ, Ciba Specialty Chemicals Inc., formula H1), 6-isooctyloxy-2,4,8,10-tetra-tert-butyl-12H-dibenzo[d,g]-1,3,2-dioxaphosphocin (formula C1), 6-fluoro-2,4,8,10-tetra-tert-butyl-12-methyl-dibenzo[d,g]-1,3,2-dioxaphosphocin (formula A1), bis(2,4-di-tert-butyl-6-methylphenyl) methyl phosphite, bis(2,4-di-tert-butyl-6-methylphenyl) ethyl phosphite (formula G1).

Particular preference is given to the use of the following phosphites and phosphonites: tris(2,4-di-tert-butylphenyl) phosphite (Irgafos® 168, Ciba Specialty Chemicals Inc.),

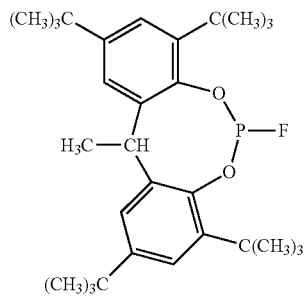 (A1)

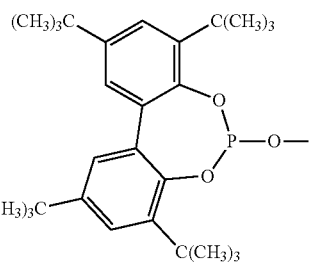 (B1)

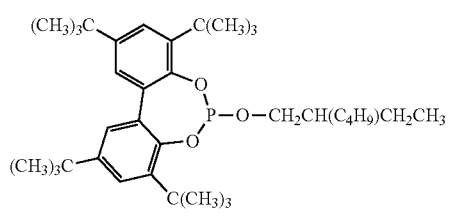 (C1)

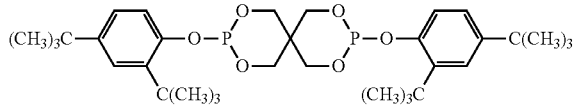 (D1)

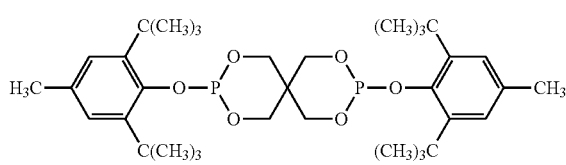 (E1)

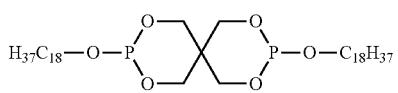 (F1)

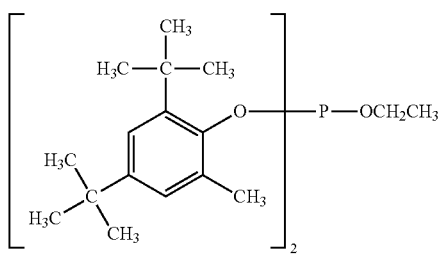 (G1)

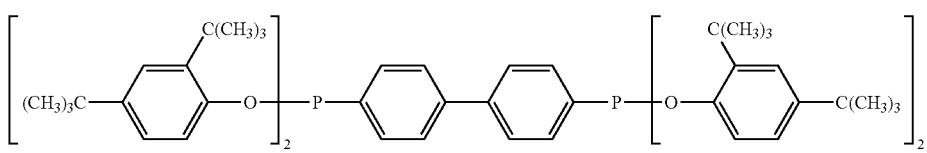 (H1)

Very particular preference is given to tris(2,4-di-tert-butylphenyl) phosphite [Irgafos® 168, Ciba Inc.], bis(2,4-di-tert-butyl-6-methylphenyl) ethyl phosphite [Irgafos® 38, Ciba Inc., formula (G1)], bis(2,4-di-tert-butylphenyl) pentaerythritol diphosphite [Irgafos®126, Ciba Inc., formula (D1)] or tetrakis(2,4-di-tert-butylphenyl)-4,4'-biphenylenediphosphonite [Irgafos®P-EPO, Ciba Inc., formula (H1)].

The above mentioned organic phosphites and phosphonites are known compounds; many of them are available commercially.

Of very special interest are compositions wherein the processing stabilizer is tris(2,4-di-tert-butylphenyl) phosphite, bis(2,4-di-tert-butyl-6-methylphenyl) ethyl phosphite, bis(2,4-di-tert-butylphenyl) pentaerythritol diphosphite, tetrakis(2,4-di-tert-butylphenyl) 4,4'-biphenylenediphosphonite, and/or a compound of the formula Ia, Ib, Ic, Id or Ig

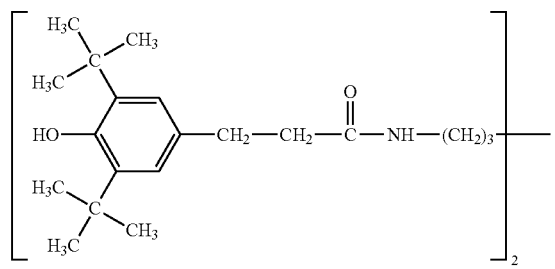 (Ia)

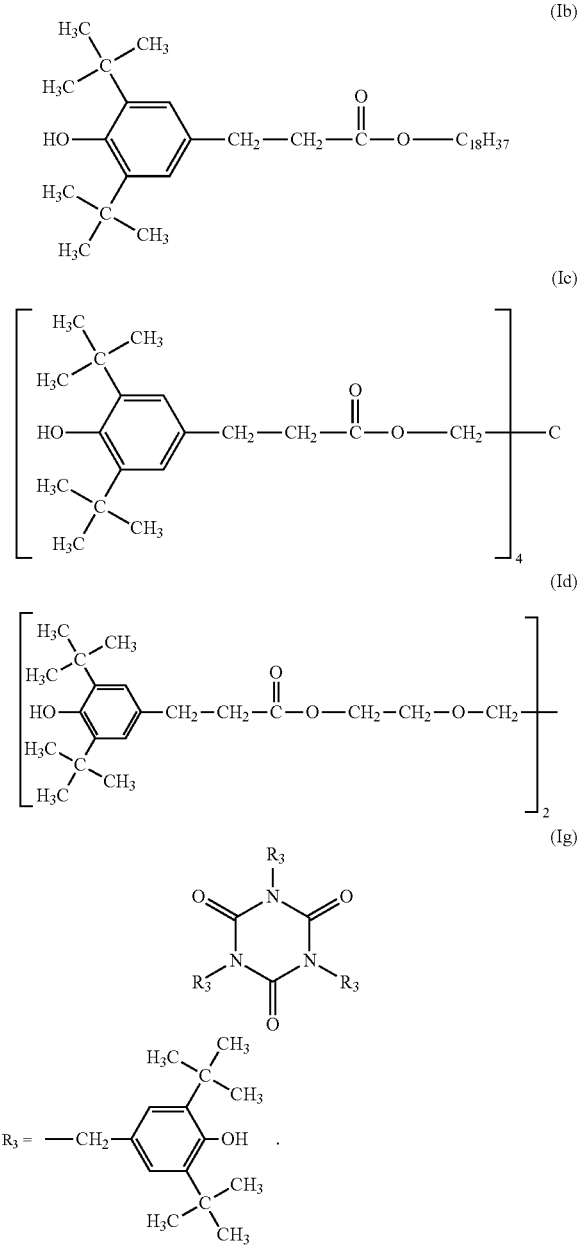

Amount

The amount of the phenolic antioxidant is preferably 700-2000 ppm, more preferably 900-1100 ppm.

The amount of the processing stabilizer is preferably 300-1000 ppm, more preferably 450-550 ppm.

The amount of ZnO is preferably 300-1000 ppm, more preferably 450-550 ppm.

Typically the weight ratio between phenolic antioxidant and the processing stabilizer is from 2:1 to 3:1.

Typically the weight ratio between phenolic antioxidant and ZnO is from 2:1 to 3:1.

Most preferably, the stabilizing additives consist of:
Irganox® 1076 900-1100 ppm
Irgafos® 16 450-550 ppm and
ZnO 450-550 ppm
Further Compositions
LLDPE Composition and LDPE The present invention further provides a polyethylene composition comprising the LLDPE composition according to the invention and one or more further components. Such PE composition according to the invention is suitable for making one or more layers of a multilayer film as described in the present application. In particular, such PE composition is suitable as the first layer or the last layer of the multilayer film for use as a shrink film. The further components may be a combination of two or more of the compounds described herein or other compounds.

The PE composition according to the invention may comprise the LLDPE composition according to the invention and a low density polyethylene (LDPE).

Preferably, the density of the low density polyethylene (LDPE) ranges from 915 to 932, for example from 920 to 928 kg/m³. Preferably, the melt flow index as determined using ISO1133:2011 (190° C./2.16 kg) ranges from 0.1 to 4 g/10 min, for example from 0.3 to 3 g/10 min, for example from 0.2 to 2 g/10 min, for example from 0.5 to 1.5 g/10 min.

The LDPE applied in the present film may be produced by use of autoclave high pressure technology and by tubular reactor technology.

The PE composition according to the invention may comprise 1-99 wt % of the LLDPE composition according to the invention and 99-1 wt % of the low density polyethylene (LDPE). The PE composition according to the invention may mainly comprise the LLDPE composition according to the invention, such as 85-99 wt % of the LLDPE composition according to the invention and 15-1 wt % of the LDPE. The PE composition according to the invention may also comprise 30-80 wt % of the LLDPE composition according to the invention and 70-20 wt % of the LDPE, 40-70 wt % of the LLDPE composition according to the invention and 60-30 wt % of the LDPE, 50-65 wt % of the LLDPE composition according to the invention and 50-35 wt %

LLDPE Composition and Plastomer

The present invention further provides a PE composition comprising the LLDPE composition according to the invention and a plastomer. Such PE composition according to the invention is suitable for making one or more layers of a multilayer film as described in the present application. In particular, such PE composition is suitable as the first layer or the last layer of the multilayer film for use as a stretch film. The layer functions as a cling layer which adheres to itself.

Plastomer

Within the framework of the invention with plastomer is meant a copolymer of ethylene and alpha-olefin comonomer having 4 to 8 carbon atoms, wherein the alpha-olefin comonomer is present in an amount from about 2.5 mole % to about 13 mole % and wherein the ethylene is present in an amount from about 97.5 mole % to about 87 mole % of the plastomer that provides for a density of 0.915 g/cc or less and is limited in an amount so as not to reduce the density to a value less than 0.865 g/cc.

The alpha-olefin comonomer in the plastomer is preferably an acyclic monoolefin such as 1-butene, 1-pentene, 1-hexene, 1-octene, or 4-methylpentene-1, most preferably 1-butene 1-hexene or 1-octene.

The comonomer of the plastomer is preferably an acyclic monoolefin such as butene-1, pentene-1, hexene-1, octene-1, or 4-methylpentene-1.

Plastomers which are suitable for use in the current invention are commercially available for example under the trademark EXACT™ available from ExxonMobil Chemical Company of Houston, Tex. or under the trademark ENGAGE™ polymers, a line of metallocene catalyzed plastomers available from Dow Chemical Company of Midland, Mich.

Plastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. Plastomers may also be prepared using traditional types of heterogeneous multi-sited Ziegler-Natta catalysts.

The PE composition according to the invention may e.g. comprise 70-99 wt % of the LLDPE composition according to the invention and 1-30 wt % of the plastomer.

LLDPE Composition and Further Polyolefins

The present invention further provides a PE composition comprising the LLDPE composition according to the invention and high density polyethylene (HDPE) and/or polypropylene.

The PE composition according to the invention may comprise 1-99 wt % of the LLDPE composition according to the invention and 99-1 wt % of the HDPE. The PE composition according to the invention may mainly comprise the LLDPE composition according to the invention, such as 85-99 wt % of the LLDPE composition according to the invention and 15-1 wt % of the HDPE. The PE composition according to the invention may also comprise 30-80 wt % of the LLDPE composition according to the invention and 70-20 wt % of the HDPE, 40-70 wt % of the LLDPE composition according to the invention and 60-30 wt % of the HDPE, 50-65 wt % of the LLDPE composition according to the invention and 50-35 wt % of the HDPE.

Preferably, the density of the HDPE ranges from 940 to 965 kg/m$^3$. Preferably, the melt flow index as determined using ISO1133:2011 (190° C./2.16 kg) ranges from 0.1 to 4 g/10 min, for example from 0.3 to 3 g/10 min, for example from 0.2 to 2 g/10 min, for example from 0.5 to 1.5 g/10 min.

The production processes of LDPE, HDPE and LLDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-Ill metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

With polypropylene as used herein is meant propylene homopolymer or a copolymer of propylene with an α-olefin, for example an α-olefin chosen from the group of α-olefin having 2 or 4 to 10 C-atoms, for example ethylene, for example wherein the amount of α-olefin is less than 10 wt % based on the total propylene copolymer.

Polypropylene and a copolymer of propylene with an α-olefin can be made by any known polymerization technique as well as with any known polymerization catalyst system. Regarding the techniques, reference can be given to slurry, solution or gasphase polymerizations; regarding the catalyst system reference can be given to Ziegler-Natta, metallocene or single-site catalyst systems. All are, in themselves, known in the art.

Preferably, the polypropylene used in the invention, is a propylene co-polymer, preferably a copolymer of propylene en ethylene.

The polypropylene has a melt temperature ($T_m$) from 140° C. to 200° C. and/or a crystallization temperature ($T_c$) from 100° C. to 140° C., wherein the $T_m$ and $T_c$ are determined using Differential Scanning calorimetry according to ASTM D 3418-08 using a scan rate of 10° C./min on a sample of 10 mg and using the second heating cycle.

Preferably, the melt mass flow rate of the polypropylene as determined using ASTM D1238-10 (230° C./2.16 kg) ranges from 0.3-100 g/10 min. Preferably, the melt mass flow rate of the polypropylene ranges from 0.5 to 25 g/10 min, more preferably from 0.5 to 10 g/10 min.

The PE composition according to the invention may comprise 1-99 wt % of the LLDPE composition according to the invention and 99-1 wt % of the polypropylene. The PE composition according to the invention may mainly comprise the LLDPE composition according to the invention, such as 85-99 wt % of the LLDPE composition according to the invention and 15-1 wt % of the polypropylene. The PE composition according to the invention may also comprise 30-80 wt % of the LLDPE composition according to the invention and 70-20 wt % of the polypropylene, 40-70 wt % of the LLDPE composition according to the invention and 60-30 wt % of the polypropylene or 50-65 wt % of the LLDPE composition according to the invention and 50-35 wt % of the polypropylene.

(Multilayer) Film

The invention further provides a film comprising the LLDPE composition according to the invention. The film may be a mono-layer film.

The invention further provides a multi-layer film comprising a layer comprising the LLDPE composition according to the invention.

The invention further provides a multi-layer film comprising a layer comprising the polyethylene composition comprising the LLDPE composition according to the invention.

In the context of the invention with 'multi-layer' film is meant that the film comprises at least three layer, for example four, five, six, seven, eight, nine, ten or eleven layers. Preferably, for ease of production by blown film co-extrusion process, the amount of layers in the multi-layer film is preferably uneven, for example wherein the amount of layers in the multi-layer film is three, five, seven, nine or eleven. For casting process, the amount of layers in the multi-layer film may be even or uneven.

The multi-layer film according to the invention may comprise at least three layers, comprising a first layer, a last layer and at least one inside layer, wherein the first and the last layer comprise the LLDPE composition according to the invention.

With first layer and last layer are meant the layers that are located on the outside of the film. As compared to other layers in the multilayer film of the invention, the first and the last layer have a substantially larger portion of the layer that faces the outside. With inside layer is meant a layer that is located between the first and the last layer. An inside layer may have direct contact with the first or the last layer, but may also not be in direct contact with the first or the last layer, for example may only have indirect contact with the first or the last layer through one or more layers.

The amount of linear low density polyethylene in the first and/or last layer is preferably at least 60% by weight based on the layer, more preferably at least 70%, for example at least 80%, for example at least 90%, for example at least 99%, for example 100% by weight based on the layer. Preferably, the first and/or the last layer consist essentially of linear low density polyethylene. Preferably, the first and the last layer are of the same material (e.g. comprise all the same components in the same amounts) and/or comprise the same linear low density polyethylene. However, it is also possible that the first and the last layer comprise linear low density polyethylene in a different amount and/or the first and the last layer comprise a different linear low density polyethylene.

The first and/or last layer of the multi-layer film of the invention may comprise other components besides linear low density polyethylene. For example, the first and/or last layer may further comprise additives, for example additives as described herein, and/or other polymers, for example other polyolefins, for example low density polyethylene and/or high density polyethylene and/or plastomers.

In a special embodiment, the first and/or last layer of the multi-layer film further comprise(s) LDPE. The presence of LDPE in the first and/or last layer is advantageous for giving desirable flow properties and bubble stability during the preparation of the film when the film is prepared by blown film co-extrusion process. Accordingly, the present invention provides preferred embodiments in which the film has a five layer structure wherein the film is prepared by blown film co-extrusion process and each of the first layer and the last layer comprises LDPE in an amount of 1-40 wt %, preferably 5-30 wt %.

The sum of the amount of LLDPE and the amount of LDPE in the first layer and/or the last layer may be at least 95 wt % or at least 99 wt % of the weight of the layer. The first and/or the last layer may consist of LLDPE and LDPE. The first and/or the last layer may further comprise high density polyethylene and/or polypropylene, for instance in an amount from 0 to 5 wt %, 0 to 3 wt % or 0 to 1 wt %.

In a special embodiment, the first and/or last layer of the multi-layer film further comprise(s) a plastomer, which is for example present in the first and/or last layer in a weight ratio of linear low density polyethylene composition to plastomer of 10 to 90 to for example 90 to 10, for example in a weight ratio of linear low density polyethylene to plastomer of from for example 40 to 60 to for example 60 to 40.

Preferably, the LLDPE composition and the plastomer in the first and/or last layer are mixed. The manner in which the plastomer is mixed with the linear low density polyethylene is not critical, preferably, the plastomer is well dispersed throughout the linear low density polyethylene, for example by using melt-mixing as described herein.

Preparation Method of the Film

The multilayer films of the present invention may be prepared by any method known in the art. Multilayer structures may be prepared for example by a blown film co-extrusion process, for example as disclosed in "Film Extrusion Manual", (TAPPI PRESS, 2005, ISBN 1-59510-075-X, Editor Butler, pages 413-435).

For example, in the process of coextrusion, the various resins may be first melted in separate extruders and then brought together in a feed block. The feed block is a series of flow channels which bring the layers together into a uniform stream. From this feed block, this multilayer material then flows through an adapter and out a film die. The blown film die may be an annular die. The die diameter may be a few centimeters to more than three meters across. The molten plastic is pulled upwards from the die by a pair of nip rolls high above the die (from for example 4 meters to more than 20 meters). Changing the speed of these nip rollers will change the gauge (wall thickness) of the film. Around the die an air-ring may be provided. The air exiting the air-ring cools the film as it travels upwards. In the centre of the die there may be an air outlet from which compressed air can be forced into the centre of the extruded circular profile, creating a bubble. This expands the extruded circular cross section by some ratio (a multiple of the die diameter). This ratio, called the "blow-up ratio" can be just a few percent to for example more than 300 percent of the original diameter. The nip rolls flatten the bubble into a double layer of film whose width (called the "layflat") is equal to ½ of the circumference of the bubble. This film may then be spooled or printed on, cut into shapes, and heat sealed into bags or other items.

A further suitable preparation method is casting or cast film extrusion. The preparation of a multilayer film by casting is well-known in the art. The preparation of the multilayer film according to the invention may be done as described in "Handbook of plastic films" (E. M. Abdel-Bary, iSmithers Rapra Publishing, 2003, pages 16-17).

In general, casting is a continuous operation of melting and conveying a polymer in a heated screw-and-barrel assembly. Polymer is extruded through a slit onto a chilled, highly polished turning roll, where it is quenched from one side. Film is sent to a second roller for cooling on the other side. Alternatively, polymer web is passed through a quench tank for cooling. Film then passes through a system of rollers, which have different purposes, and is finally wound onto a roll for storage.

Oxygen Barrier Layer

In some cases, the multilayer film of the present invention comprises an oxygen barrier layer. The oxygen barrier layer may comprise e.g. ethylene vinyl alcohol copolymer (EVOH), polyamide, polyvinyl chloride, polyvinylidene dichloride, polyethylene terephthalate (PET), polyethylene naphthenate (PEN), polyacrylonitrile, and copolymers and combinations thereof.

Polyamide is particularly preferred. Suitable examples of polyamide include nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, and nylon 12T, amorphous nylons such as MXD6 (a copolymer of m-xylylenediamine and adipic acid), nylon 61/6T (e.g., a copolyamide of an aliphatic hexamethylene diamide, and an aromatic isophthalic acid and terephthalic acid), etc.; and blends of any of the above, in any suitable proportions of each blend component. Commercial resins available for each type include: for nylon 6,12: CR 9™, CA 6E™, and CF 6S (Emser), 7024 B™, 7028 B™, and 7128 B™ (Ube), and VESTAMID™ D 12, D 14, and D 16 (Huels); for nylon 12: VESTAMID™ L 1600, L 1700, and L 1801 (Huels), BESNO™ (Atochem), GRILAMID™ TR 55 (Emser), and UBE™ 3024 B (Ube); for nylon 11: BESNO™ (Atochem); for nylon 6,66: ULTRAMID™ C 35 (BASF), and XTRA-FORM™ 1539 and 1590 (Allied); for nylon 6,69: GRILON™ CF 62 BSE and XE 3222 (Emser); and for nylon 6,10: ULTRAMID™ S3 and S4 (BASF). An exemplary amorphous nylon is GRIVORY™ G21, which is available from Emser Industries.

Further examples of suitable barrier layers are described e.g. in US2009061062.

Tie Layer

For the cases where the multilayer film of the present invention comprises an oxygen barrier layer, the outer layers are generally non-polar and the oxygen barrier layer is generally polar. In these cases, the multilayer film of the present invention usually comprises a tie layer. The tie layer has the function of attaching the non-polar layer and the polar layer.

The tie layer may be of any type customary for use as a tie layer for attaching a polar layer and a non-polar layer in a multilayer film. Preferably, the tie layer comprises a functionalized polyolefin containing acid or acid anhydride functional groups, for example (meth)acrylic acid or maleic anhydride. It may for example be a polyethylene or a polypropylene onto which the (meth)acrylic acid or the maleic anhydride has been grafted. Suitable materials for use in the layer b) include Yparex OH042 as described e.g. in WO2006133968. Further suitable materials include Amplify supplied by DOW and Bynel supplied by DuPont.

In particularly preferred embodiments, the tie layer may comprise anhydride-modified LLDPE, such as maleic anhydride-modified LLDPE.

The tie layer may further comprise (unmodified) LLDPE. In suitable examples, the tie layer comprises 50-80 wt % of LLDPE and 20-50 wt % of the functionalized polyolefin as described above. The presence of LLDPE allows the use of a less amount of the functionalized polyolefin, which is advantageous from the cost point of view.

Preferably, the tie layers in a multilayer film of the present invention are of the same material (e.g. comprise all the same components in the same amounts) and/or comprise the same functionalized polyolefin. However, it is also possible that the tie layers comprise functionalized polyolefin in a different amount and/or the tie layers comprise a different functionalized polyolefin.

Barrier Blown Film

The multi-layer film of the invention may be a film of five layers prepared by blown film co-extrusion process comprising, in the following order, a) a layer comprising 85-99 wt % of LLDPE composition according to the invention and 1-15 wt % of LDPE, b) a first tie layer, c) an oxygen barrier layer, d) a second tie layer, e) a layer comprising 85-99 wt % of LLDPE composition according to the invention and 1-15 wt % of LDPE.

The films may show an improved draw down enabling further down gauging, less melt-fracture compared to the conventional blown film and/or high temperature operations with fewer deposits.

The thickness of such film is typically 20-60 µm, 30-50 µm or 40-50 µm. The thickness of the layers a) and e) are typically 10-20 µm or 15-18 µm. The thickness of the layers b) and d) are typically 1-5 µm or 1-3 µm. The thickness of the layer c) is typically 1-10 µm or 2-4 µm. In particular embodiments, the film of the invention has a thickness of 40-50 µm, the layers a) and e) have a thickness of 15-18 µm, the layers b) and d) have a thickness of 1-3 µm and the layer c) has a thickness of 2-4 µm.

Such film may advantageously be used as a shrink film.

The invention further provides a process for shrink wrapping food or beverage by the film according to the invention, such as by the film according to the invention made by the blown film co-extrusion process.

The invention further provides use of the film according to the invention, such as the film according to the invention made by the blown film co-extrusion process, for shrink wrapping food or beverage.

Examples of food and beverages include but are not limited to coffee, pet food, meat fish, poultry, cheese or other dairy products, frozen foods or confectionary.

The invention further provides food or beverage shrink wrapped by the film according to the invention, such as the film according to the invention made by the blown film co-extrusion process.

Stretch Cast Film

The multi-layer film may be a film of three layers prepared by casting process comprising, in the following order, A) a cling layer comprising 90-99 wt % of the LLDPE composition according to the invention and 1-10 wt % of the plastomer, B) an intermediate layer comprising 60-100 wt % of the LLDPE composition, C) a layer consisting of the LLDPE composition, The cast film of the invention may have a high tear strength measured by ISO6383-2 and a puncture resistance measured by ASTM D5748-95.

Such film may advantageously be used as a stretch film.

The invention further provides a process for stretch wrapping food or beverage by the film according to the invention, such as by the film according to the invention made by the casting process.

The invention further provides use of the film according to the invention, such as the film according to the invention made by the casting process, for stretch wrapping food or beverage.

The invention further provides food or beverage stretch wrapped by the film according to the invention, such as the film according to the invention made by the casting process.

Use of the LLDPE Composition

The present invention further relates to use of the LLDPE composition according to the invention for making a shrink film by blown film co-extrusion process.

The present invention further relates to a process for making a shrink film using the LLDPE composition according to the invention by blown film co-extrusion process.

The present invention further relates to use of the LLDPE composition according to the invention for making a stretch film by casting process.

The present invention further relates to a process for making a stretch film using the LLDPE composition according to the invention for by casting process.

The present invention further relates to use of the LLDPE composition according to the invention, the PE composition according to the invention or the film of the invention for food packaging application.

The present invention further relates to a process for making food packaging using the LLDPE composition according to the invention, the PE composition according to the invention or the film of the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

LLDPE composition 1 was prepared by melt-mixing an LLDPE powder having a density of 918 kg/m$^3$ and a melt flow index (ISO1133, 2.16 kg/190° C.) of 2.0 g/10 minutes with additives as shown in Table 1 in a twin screw extruder. The LLDPE composition and the LLDPE powder have the same melt flow index.

LLDPE compositions 2-4 were prepared in a similar manner except that the LLDPE powder used for the preparation has different MFI and the additives used are different, as shown in Table 1.

TABLE 1

| LLDPE composition | melt flow index | stabilizing additives | density (kg/m3) |
|---|---|---|---|
| LLDPE1 | 2.0 | Irganox 1076 1000 ppm<br>Irgafos 168 500 ppm<br>ZnO 500 ppm | 918 |
| LLDPE2 | 1.0 | Irganox 1076 800 ppm<br>Irgafos 168 200 ppm<br>Zinc stearate 500 ppm | 918 |
| LLDPE3 | 2.0 | Irganox 1076 1500 ppm<br>Trinonylphenylphosphite (TNPP) 500 ppm<br>ZnO 900 ppm | 918 |
| LLDPE4 | 3.0 | Irganox 1076 1500 ppm<br>Trinonylphenylphosphite (TNPP) 500 ppm<br>ZnO 900 ppm | 918 |

LLDPE1 is an LLDPE composition according to the invention.

LLDPE2, LLDPE3, LLDPE4 are comparative examples

The melt flow index was determined by ISO1133:2011 (190° C./2.16 kg).

The density was determined by ISO1183.

LLDPE1 has an MFI suitable for a blown film co-extrusion process and a casting process.

LLDPE2 has an MFI suitable for a blown film co-extrusion process but not for a casting process.

The oxidative-induction time (OIT) tests were performed for LLDPE1 and LLDPE2 at 210° C. according to a method based on ISO11357-6, Plastics—Differential scanning calorimetry (DSC)—Part 6: Determination of oxidation induction time (isothermal OIT).

According to the results of the OIT tests, the thermal stability of LLDPE1 is much higher than LLDPE2. The OIT was measured to be 42 minutes for LLDPE1 and less than 3 minutes for LLDPE2. The high thermal stability of LLDPE1 indicates that LLDPE1 can be processed better than LLDPE2 at the high temperature that is especially required for blown film co-extrusion process. Also, the deposits for an LLDPE1 film may be less than for an LLDPE2 film prepared using blown film co-extrusion process. Hence, LLDPE1 is very suitable for preparing a blown film.

LLDPE3 and LLDPE4 comprise TNPP and therefore LLDPE1 is more suitable for food packaging applications than LLDPE3 and LLDPE4 since TNPP is a substance suspected to have a health affect. LLDPE3 and LLDPE4 are made using the same stabilizing additives. Monolayer films of 20 μm were prepared by a casting process at 270° C. using LLDPE3 and LLDPE4. Puncture resistance was measured by ASTM D5748-95 and tear strength was measured by ISO6383-2. Puncture resistance and tear strength were higher for the film made from LLDPE3 than the film made from LLDPE4. LLDPE composition made from an LLDPE having a MFI of 2.0 was found to have a higher puncture resistance and tear strength than LLDPE composition made from an LLDPE having a MFI of 3.0.

The invention claimed is:

1. A linear low density polyethylene composition comprising a linear low density polyethylene having a melt flow index of 1.5-2.5, a phenolic antioxidant, a processing stabilizer and ZnO, wherein the composition is free or substantially free of tris(nonylphenyl) phosphite (TNPP), wherein a weight ratio between the phenolic antioxidant and the processing stabilizer is from 2:1 to 3:1, and wherein a weight ratio between the phenolic antioxidant and the ZnO is from 2:1 to 3:1.

2. The composition according to claim 1, wherein the linear low density polyethylene has a density of from 917 to 920 kg/m$^3$ according to ISO1183.

3. The composition according to claim 1, wherein the total amount of the phenolic antioxidant, the processing stabilizer and ZnO is 1300 ppm to 4000 ppm based on the composition.

4. The composition according to claim 1, wherein the phenolic antioxidant is a compound represented by general formula (I):

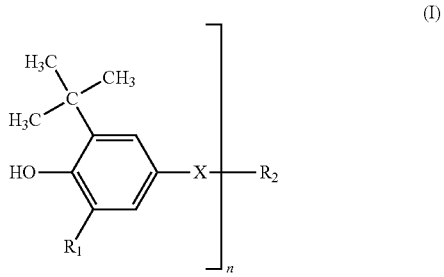

in which $R_1$ is $C_1$-$C_4$ alkyl, n is 1, 2, 3 or 4,

X is methylene,

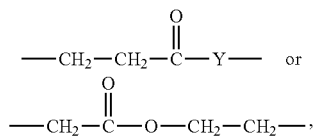

Y is hydrogen or —NH—; and,
if n is 1,
X is

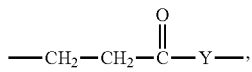

where Y is attached to R₂, and
R₂ is $C_1$-$C_{25}$ alkyl; and,
if n is 2,
X is

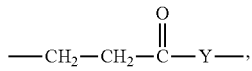

where Y is attached to R₂, and
R₂ is $C_2$-$C_{12}$ alkylene, $C_4$-$C_{12}$ alkylene interrupted by oxygen or sulfur; or, if
Y is —NH—, R₂ is additionally a direct bond; and,
if n is 3,
X is methylene or

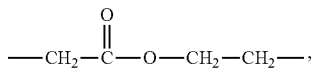

where the ethylene group is attached to R₂, and
R₂ is

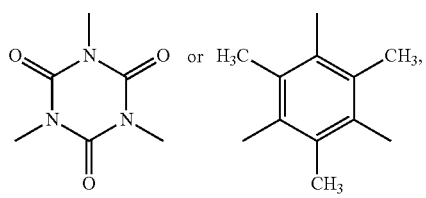

and
if n is 4,
X is

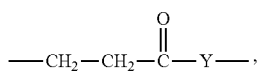

where Y is attached to R₂, and
R₂ is $C_4$-$C_{10}$ alkanetetrayl.

5. The composition according to claim 1, wherein the processing stabilizer is at least one compound of the group of the organic phosphites or phosphonites of the formulae II to VIII excluding tris(nonylphenyl) phosphite

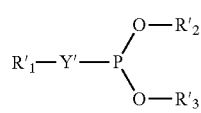
(II)

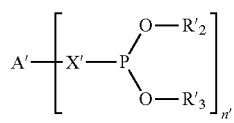
(III)

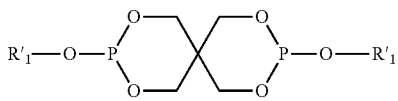
(IV)

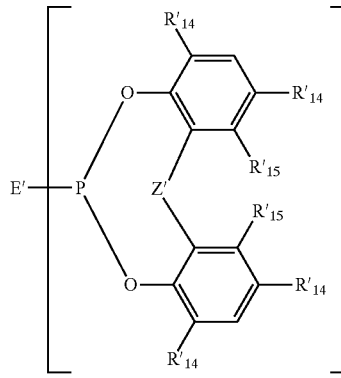
(V)

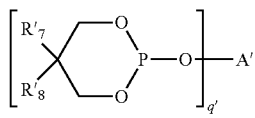
(VI)

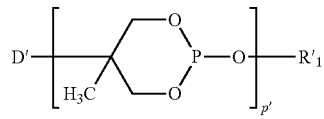
(VII)

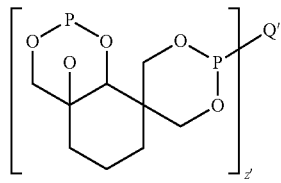
(VIII)

in which
the indices are integral and n' is 2, 3 or 4; p' is 1 or 2; q' is 2 or 3; r' is 4 to 12; y' is 1, 2 or 3; and z' is 1 to 6;
A', if n' is 2, is $C_2$-$C_{18}$ alkylene; $C_2$-$C_{12}$ alkylene interrupted by oxygen, sulfur or —NR'₄; a radical of the formula

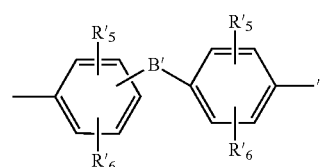

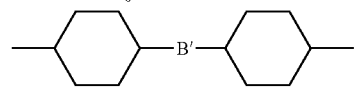

or phenylene;

A', if n' is 3, is a radical of the formula —C$_{r'}$H$_{2r'-1}$;

A', if n' is 4, is

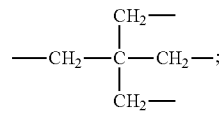

A" has the meaning of A' if n' is 2;

B' is a direct bond, —CH$_2$—, CHR'$_4$—, —CR'$_1$R'$_4$—, sulfur or C$_5$-C$_7$ cycloalkylidene, or cyclohexylidene substituted by from 1 to 4 C$_1$-C$_4$ alkyl radicals in position 3, 4 and/or 5;

D', if p' is 1, is methyl and, if p' is 2, is —CH$_2$OCH$_2$—;

E', if y' is 1, is C$_1$-C$_{18}$ alkyl, —OR'$_1$ or halogen;

E', if y is 2, is O-A"-O—,

E', if y is 3, is a radical of the formula R'$_4$C(CH$_2$O—)$_3$ or N(CH$_2$CH$_2$O—)$_3$;

Q' is the radical of an at least z'-valent alcohol or phenol, this radical being attached via the oxygen atom to the phosphorus atom;

R'$_1$, R'$_2$ and R'$_3$ independently of one another are unsubstituted or halogen, —COOR$_4$', —CN— or —CONR$_4$'R$_4$'-substituted C$_1$-C$_{18}$ alkyl; C$_2$-C$_{18}$ alkyl interrupted by oxygen, sulfur or —NR'$_4$—; C$_7$-C$_9$ phenylalkyl; C$_5$-C$_{12}$ cycloalkyl, phenyl or naphthyl; naphthyl or phenyl substituted by halogen, 1 to 3 alkyl radicals or alkoxy radicals having in total 1 to 18 carbon atoms or by C$_7$-C$_9$ phenylalkyl; or are a radical of the formula

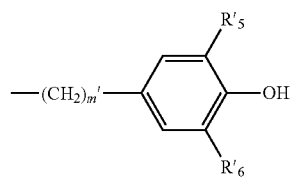

in which m' is an integer from the range 3 to 6;

R'$_4$ is hydrogen, C$_1$-C$_{18}$ alkyl, C$_5$-C$_{12}$ cycloalkyl or C$_7$-C$_9$ phenylalkyl, R'$_5$ and R'$_6$ independently of one another are hydrogen, C$_1$-C$_8$ alkyl or C$_5$-C$_6$ cycloalkyl, R'$_7$ and R'$_8$, if q' is 2, independently of one another are C$_1$-C$_4$ alkyl or together are a 2,3-dehydropentamethylene radical; and R'$_7$ and R'$_8$, if q' is 3, are methyl;

R'$_{14}$ is hydrogen, C$_1$-C$_9$ alkyl or cyclohexyl,

R'$_{15}$ is hydrogen or methyl and, if two or more radicals R'$_{14}$ and R'$_{15}$ are present, these radicals are identical or different, X' and Y' are each a direct bond or oxygen, Z' is a direct bond, methylene, —C(R'$_{16}$)$_2$— or sulfur, and R'$_{16}$ is C$_1$-C$_8$ alkyl.

6. The composition according to claim 1, wherein the amount of the phenolic antioxidant is 700-2000 ppm based on the composition.

7. The composition according to claim 1, wherein the amount of the processing stabilizer is 300-1000 ppm based on the composition.

8. The composition according to claim 1, wherein the amount of ZnO is 300-1000 ppm based on the composition.

9. A polyethylene composition comprising the LLDPE composition according to claim 1 and a low density polyethylene or a plastomer.

10. A multi-layer film comprising a layer comprising the LLDPE composition according to claim 1.

11. The film according to claim 10, wherein the film is a film of five layers prepared by blown film co-extrusion process comprising, in the following order,
 a) a layer comprising 85-99 wt % of the LLDPE composition and 1-15 wt % of LDPE,
 b) a first tie layer,
 c) an oxygen barrier layer,
 d) a second tie layer, and
 e) a layer comprising 85-99 wt % of the LLDPE composition and 1-15 wt % of LDPE.

12. The film according to claim 10, wherein the film is a film of three layers prepared by casting comprising, in the following order,
 A) a cling layer comprising 90-99 wt % of the LLDPE composition and 1-10 wt % of the plastomer, wherein the sum of the LLDPE composition and plastomer is 95-100 wt %,
 B) a layer comprising 60-100 wt % of the LLDPE composition, and
 C) a layer consisting of the LLDPE composition.

13. Food packaging comprising the LLDPE composition of claim 1.

14. A method for making a shrink film, the method comprising subjecting the LLDPE composition according to claim 1 to a blown film co-extrusion process.

15. A method for making a stretch film by casting the LLDPE composition according to claim 1.

16. The composition according to claim 1, wherein
 the phenolic antioxidant is represented by the formula (Ib)

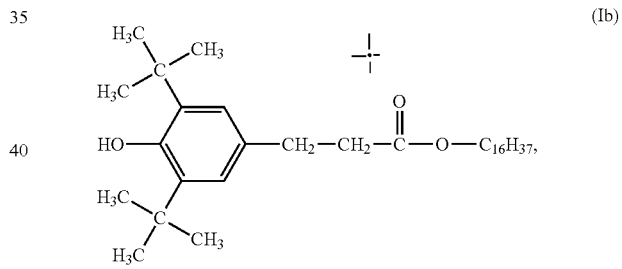

and
 the processing stabilizer is tris(2,4-di-tert-butylphenyl) phosphite.

17. A linear low density polyethylene composition comprising a linear low density polyethylene having a melt flow index of 1.5-2.5, a phenolic antioxidant, a processing stabilizer and ZnO, wherein the composition is free or substantially free of tris(nonylphenyl) phosphite (TNPP),
 wherein the amount of the phenolic antioxidant is 900-1100 ppm, the amount of the processing stabilizer is 450-550 ppm, and the amount of the ZnO is 450-550 ppm, each based on the composition,
 wherein a weight ratio between the phenolic antioxidant and the processing stabilizer is from 2:1 to 2.4:1, and
 wherein a weight ration between the phenolic antioxidant and the ZnO is from 2:1 to 2.4:1.

18. A multi-layer film comprising a layer comprising the polyethylene composition according to claim 9.

19. Food packaging comprising the polyethylene composition according to claim 9.

* * * * *